United States Patent [19]

Zison et al.

[11] Patent Number: 4,469,176

[45] Date of Patent: Sep. 4, 1984

[54] LANDFILL GAS RECOVERY SYSTEM AND METHOD WITH PRESSURE SYMMETRY

[75] Inventors: Stanley W. Zison, Irvine; Alex Roqueta, Redondo Beach, both of Calif.

[73] Assignee: Getty Synthetic Fuels, Inc., Signal Hill, Calif.

[21] Appl. No.: 502,093

[22] Filed: Jun. 8, 1983

[51] Int. Cl.³ .................. E21B 43/02; E21B 43/12
[52] U.S. Cl. ........................... 166/250; 166/53; 166/369; 405/129
[58] Field of Search ............ 166/369, 53, 370, 250, 166/278; 405/129; 210/603, 901, 747

[56] References Cited

U.S. PATENT DOCUMENTS

| | | | |
|---|---|---|---|
| 2,207,334 | 7/1940 | Reynolds et al. | 166/278 |
| 2,266,000 | 12/1941 | Charles | 166/278 |
| 3,705,851 | 12/1972 | Brauer | 210/747 |
| 4,026,355 | 5/1977 | Johnson et al. | 166/250 X |
| 4,183,408 | 1/1980 | Pilkington | 166/370 |
| 4,276,778 | 7/1981 | Ham | 166/250 |
| 4,323,367 | 4/1982 | Ghosh | 405/129 X |

Primary Examiner—Stephen J. Novosad
Attorney, Agent, or Firm—Gordon L. Peterson

[57] ABSTRACT

In a landfill gas recovery system, the breakthrough danger is minimized, and the system efficiency is improved, by providing pressure-equalizing low-impedance gas paths such as aggregate-filled symmetry trenches positioned within the landfill and surrounding, at least partially, the primary collection zone. The symmetry trenches may be connected to the system's low-pressure source to serve as secondary collectors. A sensing trench positioned within the landfill along the periphery of the collector's zone of influence can be used to monitor the collector pressure and to automatically maintain it at a safe level. The sensing trench can also serve as a secondary equalizing path in heterogeneous landfills. Hot spots may advantageously be tapped by auxiliary collectors whose pressure level bears a predetermined proportional relationship to the primary collector pressure.

35 Claims, 5 Drawing Figures

LANDFILL GAS RECOVERY SYSTEM AND METHOD WITH PRESSURE SYMMETRY

BACKGROUND OF THE INVENTION

Various systems have been proposed for the recovery of methane-rich gases from landfills. Such systems are described, for example, in Johnson et al U.S. Pat. No. 4,026,355 and in the copending application, Ser. No. 355,478 entitled Landfill Gas Recovery Method, now U.S. Pat. No. 4,442,901. In both of these systems, a gas collection zone is maintained at a pressure lower than the natural (positive) pressure of the gas within the landfill and, preferably, below ambient. The collection zone may take the form of one or more wells or of a shallow grid of collection pipes; in either event, however, the pressure reduction in the collection zone is limited by the need to prevent atmospheric intrusion, i.e., the sucking of outside air into the landfill where its oxygen content poisons the methane-producing organisms. Additionally, the nitrogen content of the air introduced to the landfill reduces the heating value of the processed landfill gas.

A partial solution to this problem has been proposed in the aforesaid pending application by providing a gas barrier within the cover layer of the landfill above the collection zone. This solution is adequate if the landfill is reasonably homogeneous. In practice, however, that is seldom the case, as landfills by their very nature tend to be extremely heterogeneous and often contain large fissures through which pressure differences can propagate rapidly.

It is, of course, desirable in the operation of a landfill gas recovery system to maintain the gas collection zone at the lowest allowable pressure so as to extend the zone of influence of the collector (i.e. the volume from which it collects gas) as far out as possible. In a typical landfill, a well, group of wells, or collector grid will thus create a low-pressure zone from which low-pressure areas extend unevenly in different radial directions. The resulting distortion of the zone of influence may well result in the inadvertent extension of the zone of influence beyond the confines of the gas barrier at one or more locations. If this is the case, the ability of the system to collect gas is significantly impaired because the collection pressure must then be kept at a level high enough to prevent atmospheric intrusion and this is too high to maximize gas collection.

SUMMARY OF THE INVENTION

The present invention solves the above-described problem by providing within the collector's zone of influence some type of equalizing means which intersects possible fissures and distributes the below-ambient pressure existing therein more or less evenly around the collection zone. In practice, the equalizing means preferably take the form of one or more trenches filled with coarse aggregate so as to present elongated low-impedance gas paths within the active portion of the landfill (i.e. the refuse) immediately below the cover layer of the landfill. A low-impedance gas path of this type, commonly referred to as a symmetry trench, preferably extends all the way around the collection zone at some distance therefrom but within the collector's zone of influence.

In operation, the symmetry trench in effect bleeds off the low pressure from any fissures that it crosses and distributes that low pressure more or less evenly around the collection zone so as to give the zone of influence a reasonably uniform shape. The bleeding off of the low pressure in the fissures prevents dangerously low pressures from propagating outwardly from the symmetry trench beyond the confines of any protective gas barrier which may have been installed.

Inasmuch as symmetry trenches are normally at a fairly low pressure level, they can readily serve as secondary collectors when appropriately connected into the system.

In accordance with a further aspect of the invention, a sensing trench, also in the form of a trench filled with coarse aggregate to provide a low impedance gas path, may be positioned radially outwardly of the symmetry trench or trenches. The sensing trench inherently also functions as an equalizing means although not as a collecting means. It preferably lies entirely within the zone of influence near that zone's outer boundaries. Although the sensing trench preferably completely surrounds the symmetry trench or trenches, it may be confined to those areas where fissures are suspected to extend the farthest.

In either event, the sensing trench provides a path of uniform pressure, the pressure being an indication of the lowest pressure existing at any point along the sensing trench. If the sensing trench is positioned immediately adjacent the cover layer of the landfill just inside the perimeter of a gas barrier, a sensing trench pressure of just slightly below ambient will generally assure system operation at maximum efficiency without significant atmospheric intrusion. By connecting the sensing trench to appropriate detection devices, the pressure in the sensing trench can be monitored, and the pressure of the collection zone can be adjusted accordingly to produce optimum system operation.

It is therefore the object of this invention to provide equalizing means in the form of a low-impedance gas path around at least a portion of a landfill gas collection zone so as to at least partially equalize the pressure around the collection zone and prevent distortion of the zone of influence by fissures or the like.

It is another object of this invention to provide continuous sensing means surrounding at least a portion of an equalized zone of influence to monitor the weakest portion of the zone of influence so as to prevent significant atmospheric intrusion, yet permit the recovery system to operate at maximum efficiency.

DETAILED DESCRIPTION OF THE DRAWINGS

Figure 1:
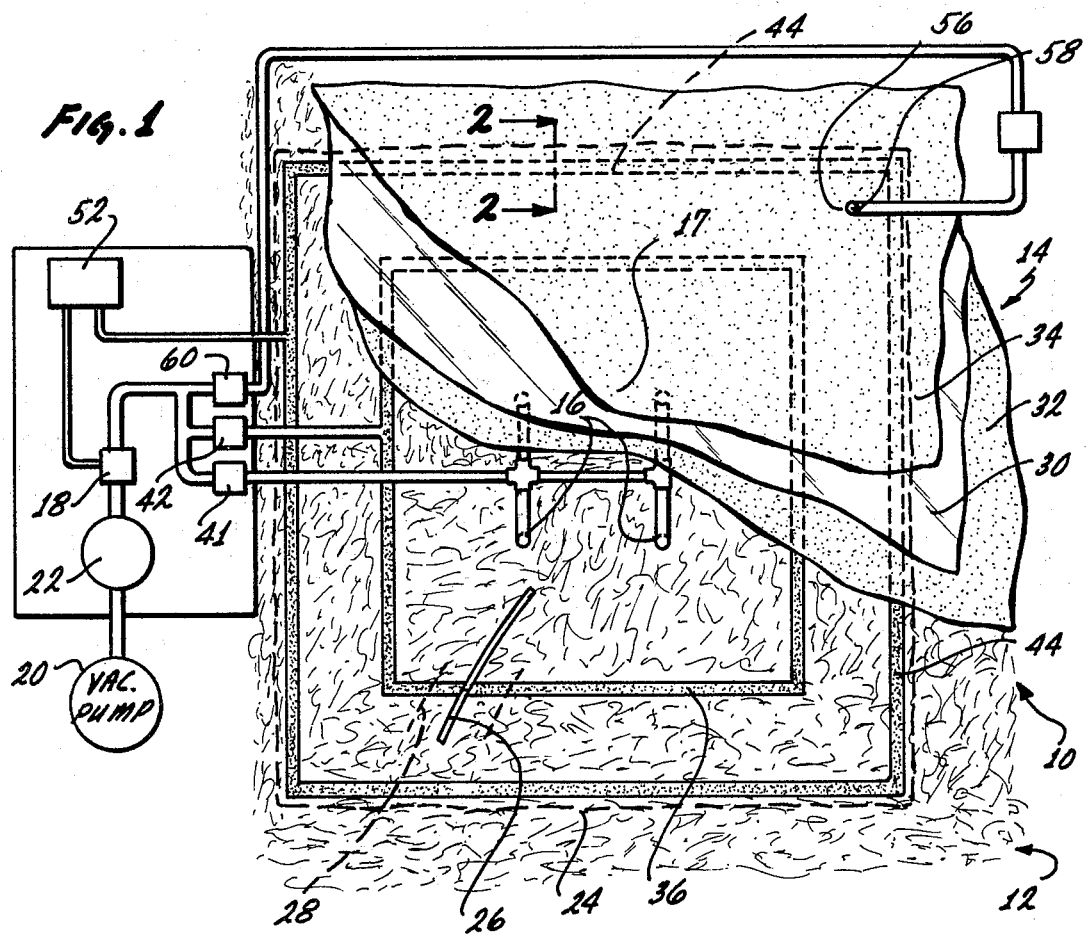
FIG. 1 is a plan view, partially cut away, of a landfill gas recovery system constructed in accordance with this invention.
Figure 3:
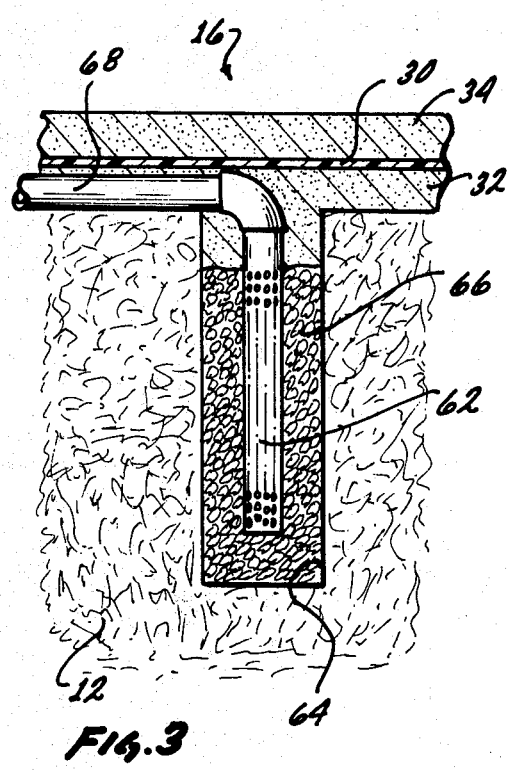
FIG. 3 is a vertical section of a collector bore or well.

FIG. 1 is a plan view of a landfill 10 having an active or refuse portion 12 and a cover portion 14. Collector wells 16 are sunk in an appropriate area of the landfill 10. The collector wells 16 may be shallow wells (on the order of five meters or less) as shown in FIG. 3, or they may be grid-type collectors immediately below the cover portion 14 as shown in the aforementioned copending application. In either event, the collectors 16 form a collection zone which is maintained at an appropriate pressure level below the natural pressure of the landfill gas (and preferably substantially below ambient) by an automatic pressure regulator 18. The operation of regulator 18 is described in more detail below. An appropriate vacuum source 20 operating through a barometric condensate trap 22 may be used to supply the necessary vacuum. The low pressure within the collection zone 17 causes landfill gas produced within the active portion 12 of landfill 10 to migrate toward collection zone 17 from a larger volume constituting the zone of influence 24 of the collectors 16.

It is possible (and in fact, frequently the case) that a fissure 26 having at least nominal resistance to flow may extend within the active portion 12 from the collection zone 17 in a generally radially outward direction. If this is the case, the low pressure of the collection zone 17 extends radially outwardly much farther than elsewhere in the landfill and results in a distortion 28 of the zone of influence 24 with a resultant loss of negative pressure (with respect to the landfill gas pressure) in other portions of the zone of influence.

As described in the aforesaid copending application, atmospheric intrusion may be prevented throughout the zone of influence 24 by inserting a gas barrier 30 between the lower layer 32 and upper layer 34 of the cover portion 14. The gas barrier 30 prevents ambient air above the landfill from penetrating into the landfill as a result of low pressure in the zone of influence and, thereby both lowering the heating value of the landfill gas and poisoning the organisms which produce the landfill gas. Typically, the gas barrier 30 extends over most of the zone of influence 24. However, the zone of influence may extend radially beyond the projected limits of the barrier 30 without unacceptably lowering the heating value of the gas as some atmospheric intrusion is acceptable.

Inasmuch as the extent of the zone of influence 24 can only be approximately calculated, the presence of a fissure such as 26, can readily produce a sufficient distortion to take portions of the zone of influence 24 unacceptably beyond the confines of the gas barrier 30. If this occurs, there is a substantial danger of atmospheric intrusion at those locations where low pressures extend beyond the confines of the gas barrier 30. Such an atmospheric intrusion could go unnoticed for some time, as it could be rather localized, and extensive contamination of the landfill 10 could occur before the problem is discovered.

Figure 2:
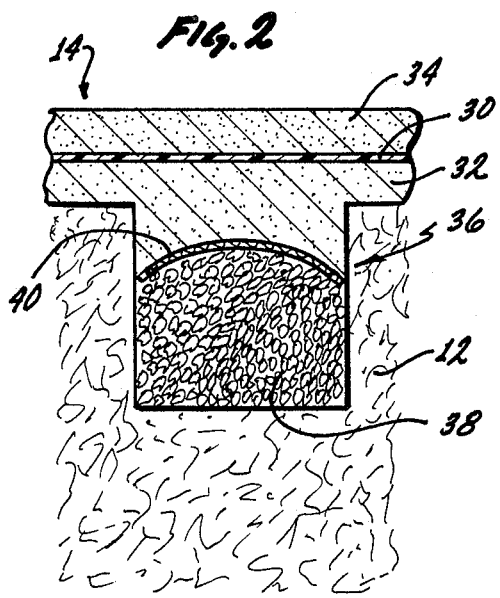
FIG. 2 is a vertical section of a symmetry or sensing trench.

To avoid this problem, the present invention provides a symmetry trench 36 which surrounds the collection zone 17 and is shown in more detail in FIG. 2. The symmetry trench 36 preferably (though not necessarily) extends all around the collection zone 17 and is preferably located wholly within the zone of influence 24. A plurality of symmetry trenches may of course be provided if desired.

As shown in FIG. 2, the symmetry trench 36 is positioned adjacent the surface of the landfill 10 immediately below the cover portion 14 and within the active portion 12 of the landfill 10. The symmetry trench 36 constitutes a low-impedance gas path and is preferably constructed of coarse aggregate 38 covered with a porous geotextile fabric 40 to contain the aggregate 38 within the trench 36, yet permit gas from the active portion 12 of the landfill to percolate into the aggregate 38.

Due to the low impedance of the gas path provided by the trench 36, the low pressure existing in a fissure 26 which crosses the symmetry trench 36 will be effectively bled off and distributed more or less evenly around the perimeter of the zone of influence 24. Due to the relative impedances of the trench 36 and the refuse 12 itself, the equalization may only be partial, but it will occur to at least some degree.

The pressure in the symmetry trench 36 with respect to the pressure in wells 16 can be regulated, if desired, by appropriately setting the proportioning valves 41, 42. As a result of this arrangement, the shape and extent of the zone of influence 24 can be accurately controlled and equalized all around the collection zone 17 so as to allow operation of the recovery system at maximum efficiency. In addition, the connection of the symmetry trench 36 to the vacuum pump 20 makes it possible to use the symmetry trench 36 as a secondary gas collector for the system.

The operation of the system and the equalizing means provided by the symmetry trench 36 can be effectively monitored and enhanced by providing a sensing trench 44. The sensing trench 44 preferably (but not necessarily) extends all the way around the symmetry trench or trenches 36 within the zone of influence 24 and is preferably positioned a few meters inwardly of the perimeter of the gas barrier 30.

The construction of the sensing trench may be identical to that of the symmetry trench 36 as shown in FIG. 2. Like the symmetry trench 36, the sensing trench 44 is preferably positioned immediately below the cover portion 14 of the landfill and consists of coarse aggregate 38 covered with a geotextile fabric 40. The sensing trench 44 is connected to a pressure sensor 52 (FIG. 1) which, due to the low impedance of the gas path within the aggregate 46, will effectively sense a close approximation of the minimum pressure existing anywhere along the sensing trench 44. By making the sensor 52 also responsive to ambient atmospheric pressure, and connecting it to operate the pressure regulator 18 in accordance with known techniques, the system of this invention can automatically be regulated to operate at a pressure which will produce a pressure level just slightly below ambient. This will normally prevent a significant atmospheric intrusion even at the weakest point along the perimeter of gas barrier 30, while at the same time achieving the maximum safe gas collection rate.

Because of its low impedance to gas flow, the sensing trench 44 also inherently operates as an equalizing means. However, unlike the symmetry trench 36, the sensing trench 44 is not connected to the vacuum pump 20 and cannot therefore be used as a secondary collector.

It may be desirable, in order to enhance the operation of the system, to collect gas separately from any high-pressure "hot spots" 56 which may exist within, or in the vicinity of, the zone of influence 24. Whenever such a hot spot is detected, an auxiliary collector well 58 may be sunk into it. The well 58 may have its own proportioning valve 60 to allow the well 58 to operate at whatever local relative pressure may be most compatible with the system as a whole. The use of an auxiliary collector well 58 is particularly indicated for better gas recovery if the presence of fissures or high permeability on the side of the zone of influence 24 opposite from the hot spot tends to bleed gas away from the hot spot.

Figure 4:
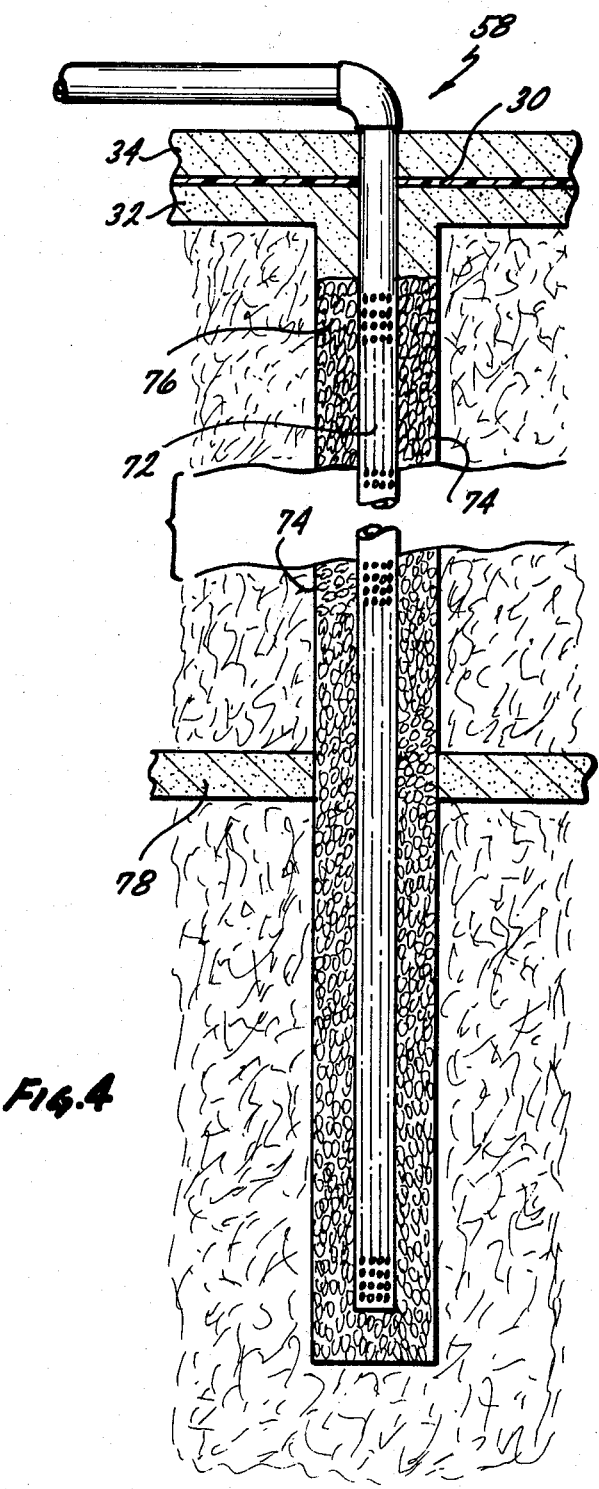
FIG. 4 is a vertical section of an auxiliary well.

FIGS. 3 and 4 illustrate, as a matter of example, the type of devices which may be used for the collector wells 16 and the auxiliary collector 58. In FIG. 3, a collector well 16 consisting of a perforated pipe 62 is sunk into the active portion 12 of the landfill within a bore 64 filled with coarse aggregate 66. Preferably, the perforated pipe 62 is connected to other wells or to a collection grid by a horizontal pipe 68 located below the gas barrier 30. As shown in FIG. 4, however, auxiliary wells such as 58 may be sunk through the gas barrier 30 wherever needed. The auxiliary wells 58 likewise consist of a perforated pipe 72 located within a bore 74 filled with aggregate 76.

It should be noted that whereas the auxiliary collection wells 58 may extend to essentially any depth within the landfill 10 (even below an intermediate cover layer 78 if desired), the collector wells 16 are preferably fairly shallow (e.g. on the order of five meters or less) so as to prevent low pressure areas from being formed far from the surface of the landfill where they cannot be influenced by the symmetry trench 36 and may have unpredictable effects. Considering the fact that landfill gas tends to rise to the surface of the landfill under its own natural pressure, the shallowness of the collector well 16 is of no consequence in the system's effectiveness of gas recovery.

Figure 5:
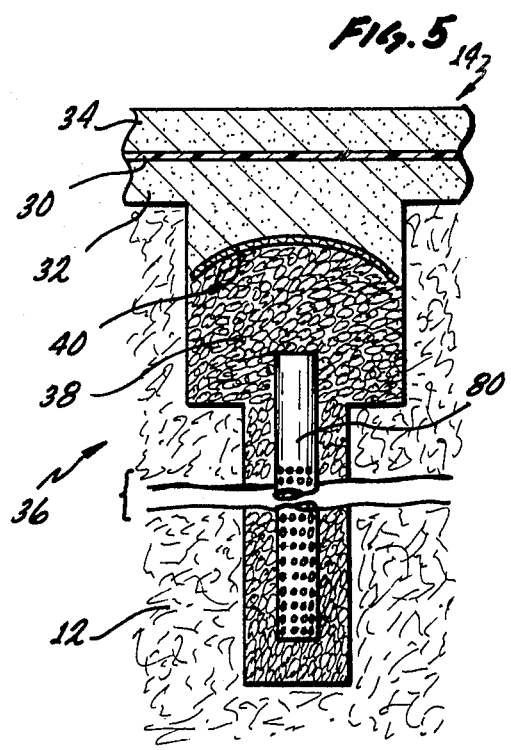
FIG. 5 is a vertical section of an alternate embodiment of a symmetry trench.

FIG. 5 shows an alternative embodiment of the symmetry trench 36. The upper portion of the trench 36 in this embodiment is identical to the trench described above in connection with FIG. 2. In the embodiment of FIG. 5, however, a plurality of symmetry wells 80 are disposed at intervals along the extent of symmetry trench 36 to extend the equalizing function of trench 36 into portions of the landfill more remote from the surface, and to also collect additional gas.

We claim:

1. A method of reducing air intrusion during the recovery of landfill gas from a landfill, comprising the steps of:
   (a) providing a gas collection zone in said landfill in proximity to its surface;
   (b) maintaining said collection zone at a pressure lower than the pressure of said gas in said landfill; and
   (c) positioning an elongated low-impedance gas path in said landfill in proximity to its surface and to said gas collection zone, said path extending in a generally non-radial direction with respect to said gas collection zone and being spaced therefrom.

2. The method of claim 1, in which said lower pressure creates a zone of influence extending radially outwardly from said collection zone, and in which said gas path is located within said zone of influence.

3. The method of claim 1, in which said gas path surrounds said collection zone.

4. The method of claim 1, in which said gas path is in the nature of a generally horizontal trench below the surface of said landfill.

5. The method of claim 1, in which said gas path serves as a secondary collection zone.

6. A landfill gas recovery system, comprising:
   (a) gas collection means disposed in said landfill in proximity to its surface;
   (b) means for maintaining said collection means at a pressure lower than the pressure of said gas in said landfill; and
   (c) elongated low-impedance gas path means disposed in said landfill in proximity to, and generally parallel to, its surface at a location spaced from said collection means but in proximity thereto.

7. The system of claim 6, in which the pressure in said collection means is maintained substantially lower than ambient.

8. The system of claim 7, further comprising pressure-varying means arranged to vary the pressure in said collection means in accordance with the difference in the ambient pressure and the pressure at a location within the landfill.

9. The system of claim 6, further comprising gas barrier means disposed in said landfill between said collection means and the landfill surface.

10. The system of claim 9, in which said trench contains coarse aggregate.

11. The system of claim 10, in which said collection means have a zone of influence extending radially outwardly therefrom, and said gas path means are positioned within said zone of influence.

12. The system of claim 6, in which said gas path means are in the form of a trench positioned in the active portion of said landfill immediately below its cover portion.

13. The system of claim 12, in which said gas path means include symmetry well means extending downwardly therefrom.

14. The system of claim 6, in which said gas path means surround said collection means in spaced relation thereto.

15. The system of claim 14, in which said gas path means extend generally transversely to said radially outward direction.

16. The system of claim 15, further comprising means for maintaining the pressure in said gas path means in a selectable proportion to the pressure in said collection means.

17. The system of claim 15, in which said gas path means is arranged to serve as a secondary gas collection means.

18. The system of claim 17, further comprising means for adjusting the pressure in said collection means in response to the pressure sensed by said sensing means.

19. The system of claim 6, in which said collection means have a zone of influence extending radially outwardly therefrom, and said gas path means are positioned within said zone of influence.

20. The system or claim 6, further including means for maintaining said gas path means at a pressure lower than the pressure of said gas in said landfill.

21. The system of claim 6, further comprising pressure sensing means disposed in said landfill outwardly of said gas path means with respect to said collection means.

22. The system of claim 21, in which said sensing means include sensing trench means disposed in said landfill, said sensing trench means constituting a second low-impedance gas path and being connected to a pressure sensor.

23. The system of claim 22, in which said sensing trench means at least partially surround said collection means and said first-named gas path means.

24. The system of claim 6, in which said collection means includes at least one shallow bore.

25. The system of claim 24, in which said collection means include a plurality of wells with overlapping zones of influence.

26. The system of claim 25, in which said gas path means surround said plurality of wells as a group.

27. A landfill gas recovery system, comprising:
(a) gas collection means positioned in said landfill in proximity to the surface thereof;
(b) means for maintaining said gas collection means at a pressure lower than the pressure of said gas in said landfill; and
(c) equalizing means for at least partially equalizing the gas pressure at a plurality of points in different directions radially outwardly of said collection means.

28. The system of claim 27, in which said points are generally equidistant from said collection means to provide a generally uniform zone of influence.

29. A method of recovering landfill gas from a landfill, comprising the steps of:
(a) providing a gas collection zone in said landfill in proximity to its surface;
(b) maintaining said collection zone at a pressure lower than the pressure of said gas in said landfill; and
(c) at least partially equalizing the pressure of said gas in said landfill in at least a plurality of locations radially outward of said gas collection zone.

30. The method of claim 29, in which said locations are positioned within the zone of influence of said collection zone.

31. The method of claim 29, further comprising the step of sensing the gas pressure in said landfill radially outwardly of said equalized locations.

32. The method of claim 31, further comprising the step of adjusting the pressure in said collection zone in accordance with said sensed pressure.

33. The method of claim 31, further comprising the step of adjusting the pressure in said collection zone in accordance with both said sensed pressure and ambient pressure.

34. A landfill gas recovery system for landfills having hot spots, comprising:
(a) a primary gas collection means disposed in said landfill in proximity to its surface;
(b) means for maintaining said primary collection means at a pressure lower than the pressure of said gas in said landfill;
(c) elongated low-impedance gas path means disposed in said landfill in proximity to, and generally parallel to, its surface at a location spaced from said collection means but in proximity thereto; and
(d) auxiliary gas collection means positioned at said hot spots.

35. The system of claim 34, further including means for maintaining said auxiliary collection means at a pressure proportional to the pressure in said primary collection means.

* * * * *